United States Patent [19]
Cseri

[11] 4,102,524
[45] Jul. 25, 1978

[54] PIPE ANCHOR BRACKET

[75] Inventor: Zoltan Cseri, Northbrook, Ill.

[73] Assignee: United States Gypsum Company, Chicago, Ill.

[21] Appl. No.: 831,838

[22] Filed: Sep. 9, 1977

Related U.S. Application Data

[63] Continuation of Ser. No. 672,086, Mar. 31, 1976, abandoned.

[51] Int. Cl.² .............................................. F16L 5/00
[52] U.S. Cl. ..................................... 248/56; 248/67.5
[58] Field of Search ................... 248/56, 57, 65, 67.5, 248/74 R, 74 B

[56] References Cited
U.S. PATENT DOCUMENTS

| 2,546,792 | 3/1951 | Smith et al. | 248/56 |
| 2,919,087 | 12/1959 | Joy | 248/56 |
| 3,856,244 | 12/1974 | Menshen | 248/67.5 |
| 4,029,276 | 6/1977 | Zielie | 248/74 R |

Primary Examiner—Robert A. Hafer
Attorney, Agent, or Firm—Glenn W. Ohlson; Samuel Kurlandsky; Robert H. Robinson

[57] ABSTRACT

A pipe anchor bracket member is disclosed. The pipe anchor bracket, when engaged with a like member, forms a means for attaching pipes to other structures. The bracket member has a body section with a portion thereof curved to accommodate the outside surface of the pipe to be supported. The body portion terminates at one end in a flange having an outside locking surface and terminates at the other end in a curved flange having an inside locking surface adapted to engage in a locking manner the outside locking surface of a like member with the curved flange having a tab thereon adapted to secure the member to a like member with a pipe therebetween. The body section has extending therefrom means for securing the member to a supporting structure.

10 Claims, 9 Drawing Figures

PIPE ANCHOR BRACKET

BACKGROUND OF THE INVENTION

1. Field of the Invention

This invention relates to a pipe anchor bracket.

Description of the Prior Art

For many years a need has existed for a heavy duty bracket for attaching pipes to supporting structures. One area where the need has been more obvious than others is in railroad cars where utility and accessory pipes are customarily suspended from the undercarriage of the car in an exposed manner. In such an application it is important that the brackets that support the pipes are heavy duty and able to accommodate heavy loads in addition to the stress and treatment occuring in the operation of the railroad car. Additionally, since frequently the pipes pass through openings in the undercarriage, it is important that the bracket be able to center the pipe in the opening in addition to providing support for the pipe. Practical requirements for such a bracket are that it be low in cost and easy to assemble and attach. Prior to the present design, no design for a bracket has been provided which fulfills these needs.

A review of prior designs for pipe anchor brackets reveals several design approaches, but each is critically deficient in an area of importance if their use is attempted in railroad car support. In U.S. Pat. No. 2,141,222, a pipe anchor bracket is disclosed, but the locking mechanism and construction of the bracket are not sufficient to provide a heavy duty use, and if applied under a railroad car, it could not withstand the treatment to which it is subjected. Additionally, the bracket consists of two separately designed pieces, the production of which would be costly.

In U.S. Pat. No. 2,625,354, a pipe anchor bracket for railroad cars is disclosed which meets the requirements of being heavy duty, but the system of attachment to the undercarriage is expensive, and the bracket consists of three separately designed pieces resulting in an undue and unnecessary expense for an item of high volume. Additionally, the installation is made difficult not only by the complexity of attachment but by the necessity of attachment of multiple parts. Inventory and control of a number of different parts provides an additional problem in that design.

U.S. Pat. No. 2,708,299 discloses a cable clamp which overcomes the problem of multiple parts, but the attachment system is expensive and time consuming, and the design is toward a stationary system and would not be of sufficient heavy duty design to be adaptable to railroad car usage.

U.S. Pat. No. 3,185,419 discloses a pipe hanger making use of identical parts mated together, but the design is not heavy duty and would not withstand the treatment expected in a moving system. In addition, only one type of attachment is made possible with the hanger, and that attachment requires a channel-shaped beam, the omission of which makes the hanger inoperable. Likewise, U.S. Pat. No. 3,650,449 provides a very similiar system differing only in the method of attaching the two hanger parts to each other to secure the pipe therebetween.

U.S. Pat. No. 3,295,806 is still another example of a pipe anchor bracket wherein a multiplicity of parts provides a system incapable of heavy duty use and having most of the deficiencies associated with the prior discussed patents.

The new and novel type hanger bracket disclosed in the present invention overcomes all of the deficiencies of the prior systems and provides the first design for a pipe anchor bracket that meets all of the needs of the industry.

SUMMARY OF THE INVENTION

It is an object of this invention to provide a low cost, heavy duty, pipe anchor bracket.

It is a further object of this invention to provide a pipe anchor bracket that is easy to install.

It is an additional object of this invention to provide a pipe anchor bracket suitable for use in the railroad industry for attaching pipes to the undercarriage of a railroad car.

The objects of this invention are accomplished by a pipe anchor bracket member, which, when engaged with a like member, forms a means for attaching pipes to other structures, said bracket member having a body section with a portion thereof curved to accommodate the outside surface of the pipe to be supported, said body portion terminating at one end in a flange having an outside locking surface and said body portion terminating at the other end in a curved flange having an inside locking surface adapted to engage in a locking manner the outside locking surface of a like member, said curved flange having a tab thereon adapted to secure the member to a like member with a pipe therebetween, and said body section having extending therefrom means for securing the member to a supporting structure.

In the pipe anchor bracket of this invention, it is important to note that the bracket consists of two members of essentially the same design which can be used together to form a bracket. The pipe anchor members have a body portion with at least a portion of the midsection being curved to fit the outside curvature of the pipe in order to secure the pipe firmly without damaging it. One end of the body portion terminates in a flange having an outside locking surface. This feature is accomplished generally by a bending of the end of the body portion outward until it is pointing away from the center of the curvature of the body portion. In addition, the outside locking surface is designed to slope downward from the sides of the member to the center of the member. The body portion terminates at the other end in a curved flange having an inside locking surface adapted to engage in a locking manner the outside locking surface of a like member. The curved flange is of a design that will enable it to partially encircle the opposing end of flange of a like member when the two are in a mating relationship. The curved flange has an inside locking surface which also slopes downward from the sides of the member to the center of the member. When a like member is put in a mating relationship, i.e. into a locking manner with a first member, the second member is inverted and the locking surface on one flange slopes from the sides of the member toward the flange on the other member. The degree of slope of the locking surfaces must be such that when one member is placed around a pipe and the other member is placed around the pipe at the opposing side thereof, and the two members are forced in a sideways direction, one to the other, the locking surfaces and the slopes thereon will cause a binding action before the members are completely together. The curved flanges have a tab thereon adapted to secure the member to a like member with a pipe therebetween. This is ideally a tab projecting from the side of the member and being adapted to be bent over the other member to create a locking action. In installation, when the two members are placed together sideways, as hereinbefore indicated, and forced into a locking action due to the locking surfaces, the installer then takes a hammer or some other such object and drives one of the tabs over the opposing flanges to secure the pipe in the hanger and to secure the hanger parts together. At this instance, the pipe becomes a integral part of the securing action since it forces the flanges apart and causes the locking surfaces to operate. It must be noted that only one of the two tabs causes a locking action upon bending and only this one tab need be bent.

In installation, the hanger bracket members may be first installed about the pipe and then attached to a supporting structure, or a first member may be attached to the supporting structure and the second member locked thereto after the pipe is placed in its supported position. Attachment can be by any known device or method, such as screws, bolts, nuts, and the like, although in railroad car operation it is generally preferred for the member to be secured to the undercarriage by welding. For attachment, the body section has an extension which enables it to be secured to a supporting structure, and this extension can be of any design necessary to accommodate the intended method of installation.

When the pipe is being installed through a opening in a supporting structure, and where damage to the pipe may occur if a sharp edge in the opening is in constant contact with the pipe during movement of the supporting structure, it is preferred to provide for centering of the pipe in the opening by providing a centering tab extending from a side of the body section of each of the bracket members.

Still other objects will readily present themselves to one skilled in the art upon reference to the following specification, the drawings and the claims.

BRIEF DESCRIPTION OF THE DRAWINGS

This invention may be more fully described, but is not limited by the attached drawings wherein.

DESCRIPTION OF THE PREFERRED EMBODIMENTS

Figure 1:
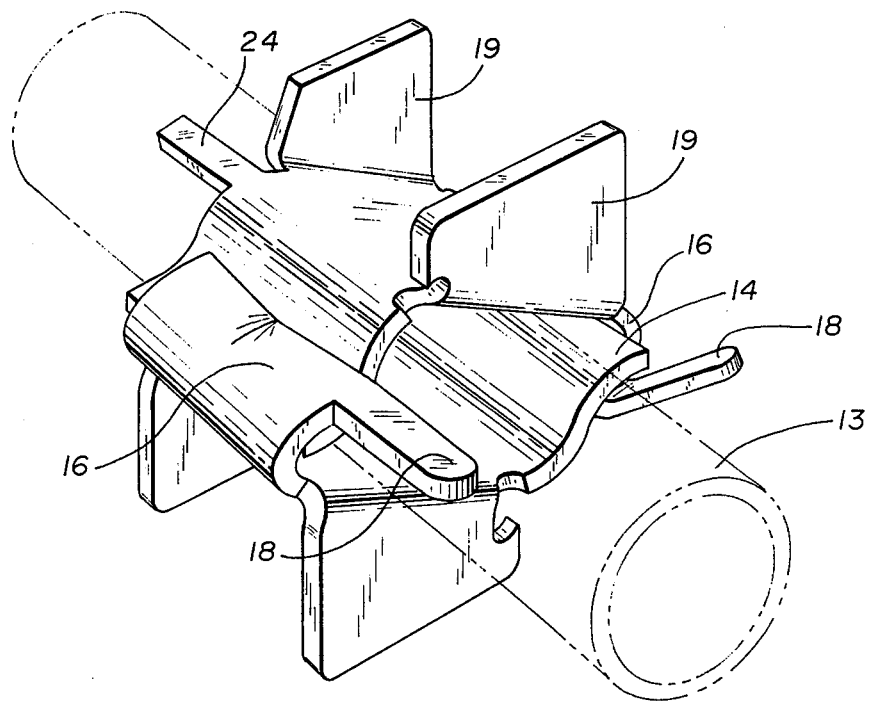
FIG. 1 is a perspective view of two pipe anchor bracket members of this inventin being placed together in a locking manner around a pipe.
Figure 2:
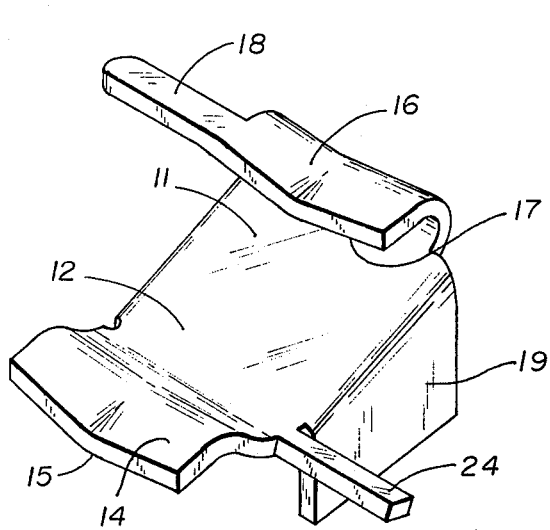
FIG. 2 is a perspective view of a pipe anchor bracket member of this invention having a centering tab thereon.
Figure 3:
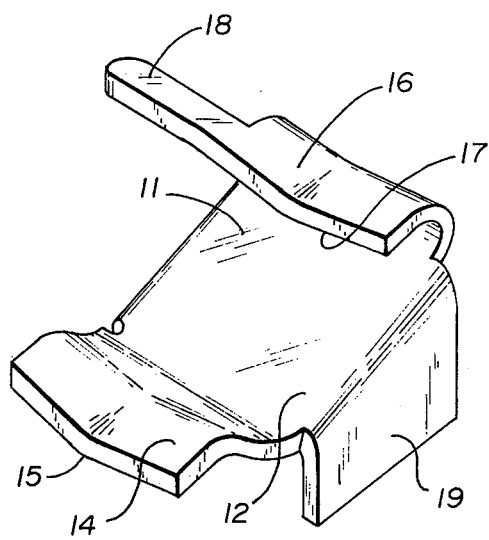
FIG. 3 is a perspective view of a pipe anchor bracket member of this invention without a centering tab thereon.
Figure 4:
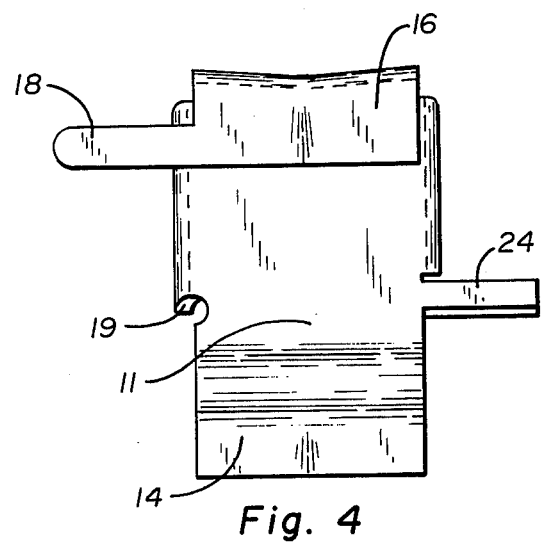
FIG. 4. is a top view of a pipe anchor bracket member of this invention with the centering tab thereon.
Figure 5:
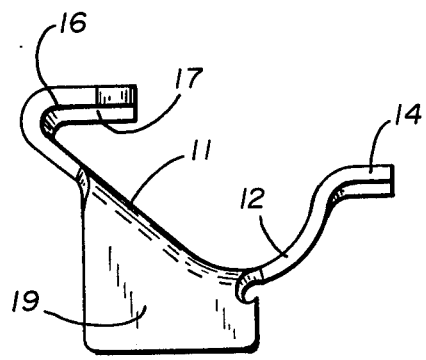
FIG. 5. is a end view of a pipe anchor bracket member of this invention.
Figure 6:
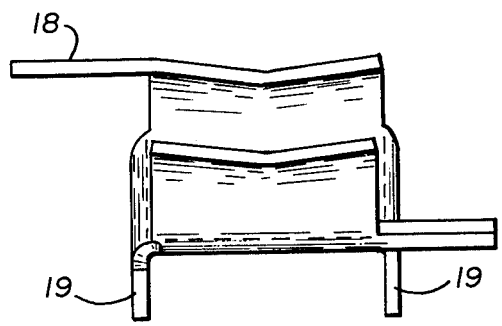
FIG. 6. is a side view of the embodiment shown in FIG. 5.
Figure 7:
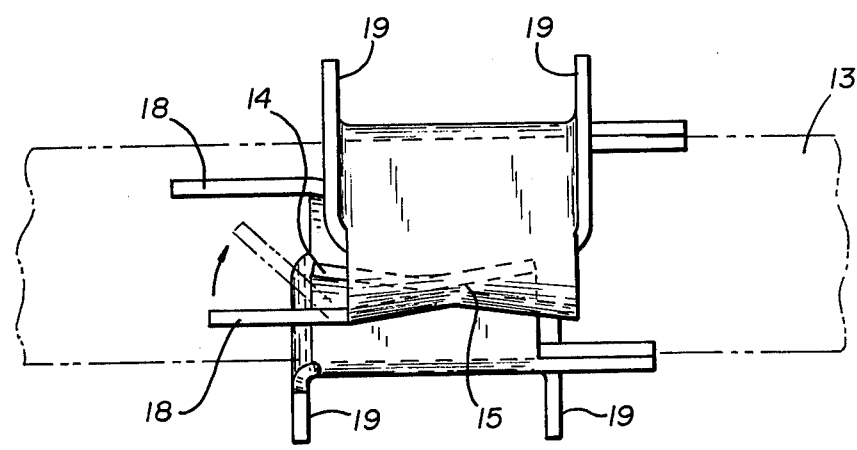
FIG. 7. is side view of two pipe anchor bracket members of this invention being secured about a pipe and indicating the initiation of locking by the bending of one of the tabs.
Figure 8:
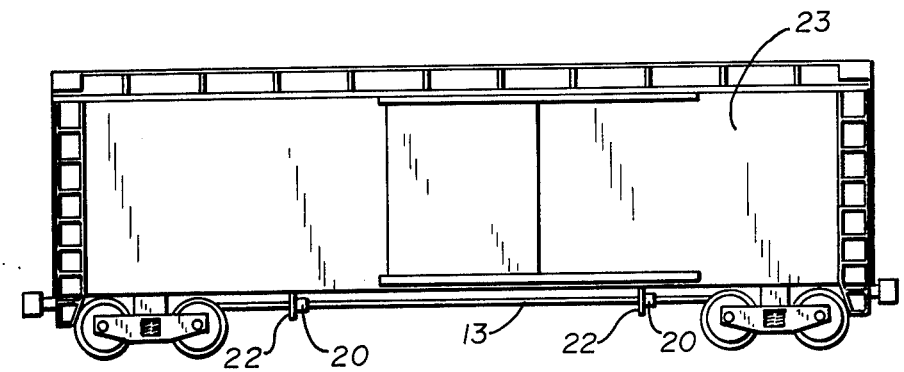
FIG. 8. is a side view of a railroad car showing the normal placement of the bracket of this invention.
Figure 9:
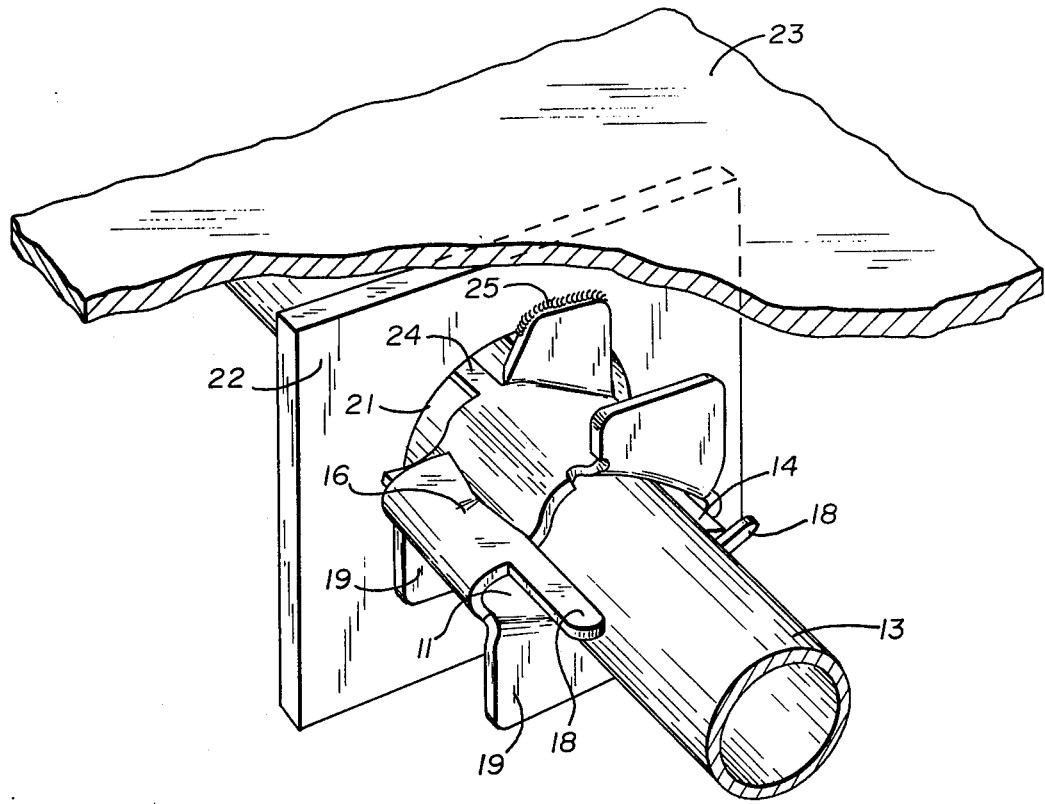
FIG. 9. is a perspective view of the installation of the pipe anchor bracket of this invention.

Referring to the drawings, a pipe anchor bracket member has a body section 11 with a curved portion 12 curved to accommodate the outside surface of the pipe 13 to be supported. The body portion terminates at one end in a flange 14 having an outside locking surface 15, and the body portion terminates at the other end in a curved flange 16 having an inside locking surface 17 adapted to engage in a locking manner the outside locking surface of a like member. The curved flange has a tab 18 thereon adapted to secure the member to a like member with a pipe therebetween. The body section has extending therefrom means for securing the member to a supporting structure such as projecting flanges 19. When the assembled bracket 20 is used to attach a pipe through an opening, such as opening 21 in undercarriage 22 of railroad car 23, it is preferred to have centering tabs 24 extending from the body portion to serve this purpose. The bracket may be attached to the supporting structure, such as the undercarriage, by conventional methods, and for purposes of illustration, this is shown as weld 25 in FIG. 9.

In installing the bracket, it is preferable to attach the upper portion of the bracket to the supporting structure, then place the pipe into the curved surface of the bracket member, then slide a second bracket member sideways along the pipe onto the first bracket member to cause the locking surfaces to engage in a locking manner and provide a rigid system, and then bend one of the tabs on the curved flanges over the opposing flange on the other member to lock the hanger in place.

While only several forms and embodiment of the invention have been shown and described, other forms and embodiments within the spirit and scope of this invention will become apparent to those skilled in the art. Therefore, the forms and embodiments shown in the drawings are to be considered as merely setting forth the invention for illustrative purposes and are not intended to limit the scope of the invention herein described and shown.

It may thus be seen that the new and novel design of a pipe anchor bracket provided in this invention far surpasses anything heretofore known or used in the industry. It makes use of one part only, which is used with a like part, and thus reduces the cost of production of multiple designs in addition to reducing the cost necessary for storage of inventory. The installation of the bracket is simple and can be accomplished with a minimum of skill. Additionally, the system is very rugged and heavy duty and is particularly adapted to fulfill the needs of the railroad industry.

Having fully described this new and unique invention, the following is claimed:

1. A pipe anchor bracket comprising two substantially identical members which, when engaged, form a means for attaching pipes to other structures, each said bracket member having a body section with a portion thereof curved to accommodate the outside surface of the pipe to be supported, said body portion terminating at one end in a flange having an outside locking surface being sloped downward from the sides of the member to the center of the member and said body portion terminating at the other end in a curved flange re-curving back towards the body section having an inside locking surface being sloped downward from the sides of the member to the center of the member adapted to engage in a locking manner the outside locking surface of the other substantially identical member, said curved flange having a tab thereon adapted to secure the member to the other substantially identical member with a pipe therebetween, and said body section having two flanged projections each one extending generally at right angles from opposite sides thereof thereby providing welding surfaces for securing the member to a supporting structure.

2. A pipe anchor bracket as in claim 1, wherein the body section of each member has a centering tab extending from a side thereof.

3. A pipe anchor bracket comprising two substantially identical members which, when engaged, form a means for attaching pipes to other structures, each said bracket member having a body section with a curved portion adapted to accommodate the outside surface of the pipe to be supported and terminating in a flange having an outside locking surface being sloped downward from the sides of the member to the center of the member, said body section further having a body-extending portion extending tangentially from the curved portion and terminating in a curved flange re-curving back towards the body section having an inside locking surface being sloped downward from the sides of the member to the center of the member adapted to engage in a locking manner the outside locking surface of the other substantially identical member, said curved flange having a tab thereon adapted to secure the member to the other substantially identical member with a pipe therebetween, and said body section having two flanged projections extending generally at right angles therefrom thereby providing welding surfaces for attaching the member to a supporting structure.

4. A pipe anchor bracket as in claim 3 wherein the body section of each member has a centering tab extending from a side thereof.

5. A pipe anchor bracket for attaching pipes to other structures, said bracket comprising two substantially identical interlocked pipe anchor members, each of said members having a body section with a portion thereof curved to accommodate the outside surface of the pipe to be supported, said body portion terminating at one end in a flange having an outside locking surface being sloped downward from the sides of the member to the center of the member and said body portion terminating at the other end in a curved flange re-curving back towards the body section having an inside locking surface being sloped downward from the sides of the member to the center of the member adapted to engage in a locking manner the outside locking surface of the other substantially identical member, said curved flange having a tab thereon adapted to secure the member to the other substantially identical member with a pipe therebetween; one of said tabs being bent over the other member to secure a pipe therebetween; and said body section having two flanged projections each one extending generally at right angles from opposite sides thereof thereby providing a welding surfaces for securing the member to a supporting structure.

6. A pipe anchor bracket as in claim 5 wherein the body section of each member has a centering tab extending from a side thereof.

7. A pipe anchor bracket for attaching pipes to other structures, said bracket comprising two substantially identical interlocked pipe anchor members, each of said members having a body section with a curved portion adapted to accommodate the outside surface of the pipe to be supported and terminating in a flange having an outside locking surface being sloped downward from the sides of the member to the center of the member, said body section further having a body-extending portion extending tangentially from the curved portion and terminating in a curved flange re-curving back towards the body section having an inside locking surface being sloped downward from the sides of the member to the center of the member adapted to engage in a locking manner the outside locking surface of the other substantially identical member, said curved flange having a tab thereon adapted to secure the member to the other substantially identical member with a pipe therebetween; at least one of said tabs being bent over the other member to secure a pipe therebetween; and said body section having two flanged projections extending generally at right angles therefrom thereby providing welding surfaces for attaching the member to a supporting structure.

8. A pipe anchor bracket as in claim 7 wherein the body section of each member has a centering tab extending from a side thereof.

9. A railroad car with a pipe secured to the underneath side of the car by a bracket, said bracket comprising two substantially identical bracket members each having a body section with a portion thereof curved to accommodate the outside surface of the pipe to be supported, said body portion terminating at one end in a flange having an outside locking surface being sloped downward from the sides of the member to the center of the member, and said body portion terminating at the other end in a curved flange re-curving back towards the body section having an inside locking surface being sloped downward from the sides of the member to the center of the member adapted to engage in a locking manner the outside locking surface of the other substantially identical member, said curved flange having a tab thereon adapted to secure the member to the other substantially identical member with a pipe therebetween; one of said tabs of one of said members bent over the other said member to hold the pipe in the bracket; and said body section having two flanged projections each one extending generally at right angles from opposite sides thereof thereby providing welding surfaces for securing the member to a supporting structure with a flanged projection of one of said members attached by means of welding to the underneath side of the railroad car.

10. A railroad car as in claim 9 wherein the pipe is centered in an opening in a supporting structure on the underneath side of the railroad car by centering tabs extending from a side of the body section of each of the bracket members.

* * * * *